United States Patent [19]

Sieloff et al.

[11] Patent Number: 4,555,447
[45] Date of Patent: Nov. 26, 1985

[54] BLOWING WOOL INSULATION

[75] Inventors: Ronald F. Sieloff, Pataskala; William A. Kays, Columbus, both of Ohio

[73] Assignee: Owens-Corning Fiberglas Corporation, Toledo, Ohio

[21] Appl. No.: 639,178

[22] Filed: Aug. 9, 1984

[51] Int. Cl.[4] .......................... B32B 9/00; B05D 3/02; C03C 25/02
[52] U.S. Cl. .................................... 428/392; 428/375; 428/288; 65/3.44; 65/3.43; 252/62; 252/8.8; 427/389.8
[58] Field of Search ............... 428/392, 222, 288, 406, 428/375; 65/3.44, 3.43, 4.4; 252/62, 8.8; 156/167, 181, 250, 254; 427/389.8

[56] References Cited

U.S. PATENT DOCUMENTS

| 3,331,669 | 7/1967 | Sinclair | 428/392 |
| 4,067,835 | 1/1978 | Takamori et al. | 428/392 |
| 4,197,350 | 4/1980 | Kleber et al. | 428/392 |
| 4,296,164 | 10/1981 | Bemis et al. | 428/392 |
| 4,381,200 | 4/1983 | Bolen et al. | 427/389.8 |

Primary Examiner—George F. Lesmes
Assistant Examiner—Beverly Johnson
Attorney, Agent, or Firm—Ronald C. Hudgens; Patrick P. Pacella; Ted C. Gillespie

[57] ABSTRACT

The use of an antistatic agent in the production of blowing wool insulation is disclosed. The antistat is a quanternary ammonium salt which is applied from an aqueous solution. The antistat reduces the tendency of the small fiber particles to dispense during pneumatical application.

12 Claims, No Drawings

BLOWING WOOL INSULATION

TECHNICAL FIELD

This invention generally relates to blowing wool insulation. More specifically, the invention relates to the use of an antistatic agent in the production of blowing wool.

BACKGROUND ART

For a number of years the commercial process of making blowing wool insulation has included the use of a hammermill wherein rotating hammers in a casing break up masses of fibrous glass wool and force it through a plate having a plurality of orifices to form it into irregularly shaped nodules.

In one process of making blowing wool, masses of fibrous glass wool are picked apart and the fibers are reformed into an even mat which is sprayed with water and slit and chopped into cubes. The cubes are advanced through troughs in which they are paddled by a series of rotating beater blades and rolled into nodules.

In a more recent development, columns of fibrous glass blowing wool are produced and bagged without any beating or padding into nodules. The columns break up at random, during the bagging process and when blown into place for insulation, into smaller prisms, approximating cubes, or flakes of various thicknesses.

The use of fiber glass blowing wool or loose-fill insulation is well known and is preferred by many contractors because it can be easily and quickly applied to new and old buildings and is a relatively low cost material. The loose fill insulation can be pneumatically applied over large horizontal surfaces. Often, the distribution of the blowing wool through the application nozzle and air creates a static charge on the fiber surfaces. These electric charges repel each other causing small fiber particles to spread out causing a "cloud of dust".

DISCLOSURE OF THE INVENTION

We have found that the use of a particular antistatic agent cuts down or reduces the tendency of the small fiber particles to disperse. By either admixing the antistatic agent in the wool or by injecting it in the application nozzle, the fibers are coated and the static charge is reduced.

We have found that the use of quanternary ammonium salt (Quat) antistatic agents controls dust in blowing wool operations. Production material when applied in the conventional manner had large amounts of dust. Frequently, particles of wool were found stuck to outside walls. The same wool mixed with ethylene glycol as an antistatic agent and immediately applied, exhibited a marked decrease in dust levels and showed negligble wool buildup on the walls. This same wool (ethylene glycol treated) when allowed to age for several days before application failed to exhibit dust decreases over the untreated material. However, when a Quat antistatic agent was used on the wool the dust reduction properties were still present six weeks later.

BEST MODE OF CARRYING OUT INVENTION

These trials determined the most efficient way to achieve reduced dust and static in cubed blowing wool both short and long term. We employed a system where chemical additives can be applied to the blowing wool in the air leg immediately after the cuber. Two air-atomized nozzles on adjacent sides of the duct provide fairly uniform coverage of the wool.

In previous trials, an oil emulsion was shown to be effective in reducing dust and some antistatic agents reduced static. Different amounts and combinations of each were used in this trial.

Three different combinations of spray were used for the trials. The first was antistatic alone, the second was an antistat and oil emulsion applied from separate nozzles, and the third a mixture of antistat and oil emulsion. Two antistats were tried, Larostat 264-A and Alkaril TC. At each set point, two bags of cubed blowing wool were tested for EOL (end of line) static, two were saved for six-week static tests and four were tested for dust and coverage.

The set point conditions and EOL static results are shown in the attached table. Larostat applied alone was very effective in reducing EOL static with excellent results. TC, when applied with oil through separate nozzles, was not effective. When oil emulsion and either antistat were mixed together, there seemed to be a synergistic effect with excellent EOL static reduction. With the relatively higher cost of the antistatic agents, this may permit effective static reduction using less antistat per pound of product. After six weeks, however, only a Quat antistatic agent continued to exhibit dust reduction properties.

TABLE

| | Blowing Wool Antistatic/Dust Trial | |
|---|---|---|
| AQUEOUS MIXTURE | POUNDS OF ANTISTATIC APPLIED PER 9000 POUNDS OF WOOL | AVERAGE VOLTAGE |
| Control | 0 | 15.8 kV |
| 3.18% L | 0.801 | 4.5 kV |
| 1.84% L | 0.464 | 5.1 kV |
| 1.34% L | 0.338 | 16.2 kV |
| Control | 0 | 15.8 kV |
| 1.84% L/25% oil* | 0.309 | 15.6 kV |
| 1.84% L/25% oil* | 0.155 | 15.6 kV |
| Control | 0 | 16.0 kV |
| 3.18% L/25% oil** | 0.801 | 0.0 kV |
| 1.67% L/25% oil** | 0.421 | 1.2 kV |
| Control | 0 | 16.7 kV |
| 3.83% TC | 0.965 | 5.6 kV |
| 2.09% TC | 0.527 | 14.7 kV |
| 1.44% TC | 0.363 | 16.0 kV |
| Control | 0 | 16.0 kV |
| 3.83% TC/25% oil** | 0.965 | 3.4 kV |
| 2.09% TC/25% oil** | 0.527 | 4.1 kV |

L = Larostat 264-A antistatic agent which is soyadimethylethyl ammonium ethosulfate from Jordan Chemical Company.
TC = Alkaril TC antistatic agent from Alkaril Chemicals, Ltd.
Oil is added as a 50% oil/water emulsion.
Percentages denote dilution level of antistat.
*Agent and oil sprayed from separate nozzles.
**Agent and oil mixed together.

The conventional oil is a standard bright stock oil which is defined as a lubricating oil of high viscosity obtained from petroleum distillation by dewaxing and treatment with fuller's earth or similar material.

INDUSTRIAL APPLICABILITY

Rotary processes have been used extensively in producing fibers, such as glass fibers, wherein the spinner is usually disposed for rotation about a vertical axis and the streams of glass, centrifuged from the spinner, engaged by a vertically downwardly directed annular gaseous blast for attenuating the centrifuged streams to fibers and the fibers collected upon a moving conveyor wherein the fibers are impinged generally vertically onto the conveyor. In such processes the vertically moving fibers are collected in random disposition in a mass upon the conveyor. Mass fibers processed into a mat and then converted to blowing wool.

Another method that has been used in forming fibers from heat-softenable material, such as glass, involves attenuating primary filaments from streams of heat-softened glass and feeding the primary filaments into horizontally directed attenuating blasts of intensely-hot high-velocity gases of combustion from combustion burners and collecting the blast-attenuated fibers upon a substantially horizontal conveyor or collecting surface. The fibers are attenuated by the burner-blast method and collected on a horizontal surface and processed into a mat.

Use of any particular type of binder may be employed with the blowing wool of this invention. Any binder suitable for bonding glass fibers together in batt or mat form can be used with glass fibers to form the bonded glass fiber material which is cut into lengths suitable for use as blowing wool. Examples of such binders are reaction products of the phenols, cresols, resorcinols, and their derivatives, and the like, with an aldehyde; reaction products of nitrogeneous resin forming compounds, such as urea and melamine, with an aldehyde, such as formaldehyde; and other condensation reaction products of furfuryl alcohol, furfural, aniline, and the like.

In implementing the cutting operation, in order to provide a practical, economical manufacturing operation, and to produce blowing wool of suitable quality, certain processing with respect to the material itself, the binder content should not be lower than about 3 percent or higher than about 15 percent, both percentages being by weight of the bonded glass fiber. If it contains no binder or less than about 3 percent binder, the blowing wool has insufficient resiliency to be compressed in bags for shipping and subsequently to be blown in place at the desired density and in the desired quantity. Without sufficient binder, the glass fiber material cannot be maintained in low density condition and would be merely packed together, producing a relatively dense mass which does not yield satisfactory coverage when blown in place. If it contains more than about 15 percent binder the binder itself, because it is present in such large quantities and because it most likely has been subjected to a rather long drying or baking operation and is especially susceptible to crumbling during the fiber-reducing operation, is the cause of excess dust as a result of being crushed in the reducing operation.

Densities of glass fiber material in the range of about 0.2 to 20 pounds per cubic foot may be used in this invention. Material of lower density than about 0.2 pound per cubic foot usually are unsuitable as blowing wool because its light, fluffy nature makes it very difficult to both obtain adequate coverage in a blowing wool installation and also provide adequate insulating value.

Preferably, the cured wool has a density ranging from 0.4 lb/ft$^3$ to 1.0 lb/ft$^3$. Binder, preferably phenol formaldehyde containing 20% or less of urea should represent 3.0 to 5.0% by weight of the blanket material.

Using the antistat agent of this invention columns of fiber glass blowing wool may be produced and bagged. The columns break up at random, during the bagging process and when blown into place for insulation, into smaller prisms, approximate cubes, or flakes of various thickness.

These antistat coated insulation pieces are applied by suitable blowing apparatus generally over horizontally extending surfaces such as attic floors, until a predetermined depth is reached which corresponds to the desired degree of thermal insulation. The glass wool flakes or prisms had a blown density of 0.475 pounds per cubic foot (7.614 kg. per cubic meter) and a conductivity of 0.529 British thermal units/(hour)(square foot)(degree Fahrenheit/inch), the conductivity being measured at 75 degrees Fahrenheit (24 degrees Celsius) mean temperature.

The application of antistat is carried out by spraying an aqueous mixture of 1 to 5 percent antistat, the percentage being by weight of the solution. Preferably the amount of antistat ranges from 1.5 to 3.5 percent in the mixture. The application rate and antistat vary widely depending upon the blowing wool product. We employed an application rate of aqueous mixture of 3 gallons per hour with an antistat rate of less than 1 pound per hour to 9,000 pounds of the wool.

This gave a blowing wool with 0.0015 to 0.0125 percent antistat on it, the percentage being by weight of final blowing wool product.

In one embodiment, the aqueous mixture of antistat may include up to 50 weight percent of an oil/water emulsion such as that described in the dust trials. Preferably this, percentage will range up to 25 weight percent.

We claim:

1. Blowing wool insulation formed from glass fibers, at least a portion of the fibers surfaces coated with an effective amount of the residue produced by evaporating water from an aqueous mixture consisting essentially of 1 to 5 weight percent of a quanternary salt of ammonium ethosulfate with water comprising the balance of the mixture wherein the percentage is by weight of the aqueous mixture.

2. Blowing wool insulation according to claim 1 wherein the ammonium salt is soyadimethylethylammonium ethosulfate.

3. Blowing wool insulation according to claim 1 wherein the weight percent of ammonium salt in the aqueous mixture ranges from 1.5 to 3.5 weight percent.

4. Blowing wool insulation according to claim 1 wherein the aqueous mixture includes a 50 percent by weight oil/water emulsion.

5. Blowing wool insulation according to claim 4 wherein the oil is a bright stock oil.

6. Blowing wool insulation according to claim 4 wherein the aqueous mixture includes up to 50 weight percent of the oil/water emulsion.

7. Blowing wool insulation according to claim 4 wherein the aqueous mixture includes up to 25 weight percent of the oil/water emulsion.

8. Blowing wool insulation formed by delamination of glass fiber products having a density ranging from 0.2 to 20 pounds per cubic foot, at least a portion of the fibers surfaces coated with an effective amount of the residue produced by evaporating water from a aqueous mixture consisting essentially of 1 to 5 weight percent of a quanternary salt of ammonium ethosulfate with water comprising the balance of the mixture wherein the percentage is by weight of the aqueous mixture.

9. Blowing wool insulation according to claim 8 wherein the ammonium salt is soyadimethylethylammonium ethosulfate.

10. Blowing wool insulation according to claim 8 wherein the weight percent of ammonium salt in the aqueous mixture ranges from 1.5 to 3.5 weight percent.

11. Blowing wool insulation according to claim 8 wherein the aqueous mixture includes a 50 percent by weight oil/water emulsion.

12. Blowing insulation comprising fibrous glass prisms, approximate cubes, and flakes of various thicknesses, formed by delamination of columns at random upon handling, the columns having been cut from a generally laminated blanket of bonded glass fibers having a density ranging from 0.2 to 20 pounds per cubic foot, at least a portion of the fibers' surfaces coated with an effective amount of the residue produced by evaporating water from a aqueous mixture consisting essentially of 1 to 5 weight percent of a quanternary salt of ammonium ethosulfate, with water comprising the balance of the mixture, wherein the percentage is by weight of the aqueous mixture.

* * * * *